United States Patent
Laporte et al.

(10) Patent No.: US 7,935,412 B2
(45) Date of Patent: *May 3, 2011

(54) BUOYANT DETECTABLE CABLE TIE

(75) Inventors: Richard Laporte, Collierville, TN (US); Robert DeWeez, Bartlett, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 1175 days.

This patent is subject to a terminal disclaimer.

(21) Appl. No.: 11/638,235

(22) Filed: Dec. 13, 2006

(65) Prior Publication Data

US 2007/0226960 A1      Oct. 4, 2007

Related U.S. Application Data

(60) Provisional application No. 60/786,955, filed on Mar. 29, 2006.

(51) Int. Cl.
*B32B 7/02*      (2006.01)

(52) U.S. Cl. .............................. 428/212; 428/220; 24/25

(58) Field of Classification Search .................. 428/212, 428/220; 24/16, 25
See application file for complete search history.

(56) References Cited

U.S. PATENT DOCUMENTS

| | | | |
|---|---|---|---|
| 3,102,311 A | 9/1963 | Martin et al. | |
| 3,186,047 A | 6/1965 | Schwester et al. | |
| D205,940 S | 10/1966 | Miller | |
| 3,803,065 A * | 4/1974 | Arai et al. | 523/205 |
| 4,152,475 A | 5/1979 | Haley | |
| 4,902,997 A | 2/1990 | Moran | |
| 5,047,100 A | 9/1991 | Raymond et al. | |
| 5,103,534 A * | 4/1992 | Caveney | 24/16 PB |
| 5,198,137 A | 3/1993 | Rutz et al. | |
| 5,395,695 A | 3/1995 | Shain et al. | |
| 5,472,661 A | 12/1995 | Gay | |
| 5,621,949 A | 4/1997 | Wells et al. | |
| 5,629,092 A | 5/1997 | Gay et al. | |
| 5,630,252 A | 5/1997 | Wells | |
| 5,679,402 A | 10/1997 | Lee | |
| 5,690,522 A | 11/1997 | Moreau | |
| 5,781,975 A | 7/1998 | Wells, Jr. et al. | |
| 6,076,235 A | 6/2000 | Khokhar | |
| 6,128,809 A | 10/2000 | Khokhar | |
| 6,185,791 B1 | 2/2001 | Khokhar | |
| 6,663,809 B1 | 12/2003 | Haddock et al. | |
| 6,816,794 B2 | 11/2004 | Alvi | |
| 7,017,237 B2 | 3/2006 | Magno, Jr. et al. | |
| 2005/0065239 A1 * | 3/2005 | Cody et al. | 523/210 |

FOREIGN PATENT DOCUMENTS

GB      2 037 869      7/1980

OTHER PUBLICATIONS

Product Bulletin for Hellermann Tyton Model MCT50L Cable Tie from Internet Website, Publication Date Unknown.

* cited by examiner

*Primary Examiner* — Mark Ruthkosky
*Assistant Examiner* — Lawrence D Ferguson
(74) *Attorney, Agent, or Firm* — Hoffmann & Baron, LLP

(57) ABSTRACT

A buoyant cable tie formed from a composition that includes a plastic material and metal particles. The average density of the composition is less than 1.25 g/cm$^3$, preferably less than 1.15 g/cm$^3$, and the cable tie floats. In one embodiment, the plastic material has a first melting point and the plastic carrier material has a second melting point. The first melting point is lower than the second melting point so that the plastic material can be melted without melting the plastic carrier material. The cable tie floats and the metal particles allow the cable ties to be easily detected by metal detection devices. Some embodiments can also be detected by X-ray, sonar, optical or visual detection devices.

28 Claims, No Drawings

BUOYANT DETECTABLE CABLE TIE

This application claims priority from provisional application Ser. No. 60/786,955, filed on Mar. 29, 2006, which is incorporated herein in its entirety. This application also incorporates in their entirety U.S. application Ser. No. 11/638,241, filed on Dec. 13, 2006 titled "Detectable Cable Tie" and U.S. application Ser. No. 11/638,134, filed on Dec. 13, 2006 titled "Cable Ties Authentically Verifiable."

FIELD OF THE INVENTION

This invention pertains to cable ties and their accessories in general and, more particularly, to cable ties that can be readily detected in a product or process stream. This invention further pertains to cable ties that are designed to be buoyant so that they will float on the surface of a fluid. Also, a small quantity of metal flakes or bits can be added to the cable tie material to make it even easier for the cable tie or portions of the cable tie to be detected using detection devices.

BACKGROUND OF INVENTION

Cable ties and their accessories, such as mounting bases, have been extensively used for several decades. Cable ties are quite useful in bundling wires or in tethering items to each other or to a support structure. Some cable ties are made of metal, some are made of plastic and some consist of a combination of metal and plastic.

The strength of a cable tie and/or its accessory is dependent on the material used to construct the cable tie, as well as the cross-sectional area of the cable tie. For a given material, the greater the cross-sectional area, the greater the strength. Thus, in order to maximize the strength, great effort is taken to eliminate any voids or air pockets which would diminish the cross-sectional area of the cable tie and hence its strength. It is important for the cable tie to maintain a certain minimum cross-sectional area along its length and for the accessory to remain intact and not rupture or break.

As a result of their solid no-void construction, cable ties and their accessories are not buoyant because they are typically made from materials having a specific gravity greater than water. An attempt to overcome this inability to float was made in U.S. Pat. No. 5,690,522 to Moreau, which discloses a floatation device that can be attached to the cable tie to provide buoyancy. However, this solution to the problem adds extensive cost since not only must another component be manufactured, but the user or the manufacturer must also assemble the two together. Additionally, the cable tie is now bulky and it is more difficult for the bundled wires to slide within a bulkhead or cable tray, and it is more difficult for other items to slide along the tied bundle due to the projection of these flotation devices. Also, such a flotation device is attached to only one section of the cable tie. Therefore, the flotation does not work when the cable tie is severed into two or more pieces, or when the cable tie accessory is separated from the cable tie, because only one flotation device is provided.

Cable ties can be made from materials that contain air voids, which would reduce the specific gravity of the cable ties. However, such a design provides an inferior product because the air pockets create areas of weakness along the cable tie. As stated above, the strength of a cable tie comes from a combination of the material of construction and the absence of voids in its cross-sectional area. Thus, if the cable tie material is displaced by air or otherwise contains voids therein, the strength of the cable tie is severely compromised. While it may be possible to construct a cable tie that floats due to air pockets in the materials, its strength would vary greatly because the quantity and the size of the internal air pockets would be randomly dispersed. Consequently, such a tie would easily break if too many air pockets (or if too large an air pocket) occur along any load-bearing cross-sectional area of the tie or device. The inherent weakness of the cable tie could not be detected until the cable tie actually broke. Accordingly, cable ties with voids are not a satisfactory solution for the user.

Many different industries, such as the food, pharmaceutical, rubber molding and nuclear industries, employ different types of detection equipment in order to remove any impurity or stray item that may be found in a product or process stream. Such devices include vision, photo or optic systems; systems that compare the product against an ideal configuration for such product; and X-ray or metal detection devices that use density or magnetic properties for detection. These industries make every effort to detect and remove any foreign material that inadvertently enters any critical product or process stream before any harm is caused.

Cable ties formed from plastic resins, whether they are of one-piece or two-piece construction, are generally identified or referred to in the industry as nylon or plastic cable ties. The density of these cable ties can vary depending on the plastic resin used. Consequently, cable ties, or portions of cable ties, that inadvertently enter a product stream can sink to different depths in the stream, or all the way to the bottom, depending in part on the density of the cable tie materials and the density of the process stream material.

One cable tie manufacturer has added metal particles to nylon cable ties so that they can be detected in the event that a tie breaks or a cut-off tail ends up where it is not wanted. The metal particles allow the cable ties or tails to be more easily detected, located and removed. These ties are sold by Hellermann-Tyton as Model No. MCT50L and described in the advertising literature as metal content ties, which are able to be detected by standard metal detecting equipment. However, in order to assure that the ties can be detected, the Hellermann-Tyton cable ties have a very high metal particle content. Hellermann-Tyton discloses in its literature that the composition used to make the cable ties contains polyamide (nylon) 6,6 and 10% metal particles. This results in a cable tie with a density greater than 1.8 which cannot float in water and almost immediately sinks to the bottom of a process stream.

Thus, it is an object of this invention to provide detectable cable ties and accessories that are buoyant. A further object of this invention it to provide a floating cable tie that contains metal particles and/or compounds without resorting to add-on devices. Still another object of this invention is to provide floating cable ties and accessories without compromising the integrity or affecting the strength of the cable tie. Yet another object of this invention is to provide a buoyant cable tie that is similar in shape and function to cable ties currently in use so that users can readily adapt to the new design. Another object of this invention is to provide a cable tie with ferrous or non-ferrous additives which facilitate the detection of the cable tie and any portion or component thereof. These and other objects and advantages of this invention will become obvious in view of the description below.

SUMMARY OF THE INVENTION

The present invention relates to a buoyant cable tie formed from a composition that includes a plastic material which makes up a first weight percent of the composition and has a first density; and metal particles which make up a second weight percent of the composition and have a second density. The sum of the product of the first weight percent and the first density and the product of the second weight percent and the second density is less than 1.25 g/cm³, preferably less than 1.15 g/cm³. The cable tie floats and the metal particles allow the cable ties to be easily detected by metal detection devices. Some embodiments can also be detected by X-ray, sonar, optical or visual detection devices.

In a preferred embodiment, a buoyant cable tie is formed from a composition that includes: a plastic material having a first melting point; and metal particles in a plastic carrier material which has a second melting point. The first melting point is lower than or equal to the second melting point so that the plastic material can be melted without melting the plastic carrier material. Preferably, the first melting point is lower than the second melting point. The average density of the composition is less than 1.25 g/cm³, preferably less than 1.15 g/cm³, and the cable tie floats.

The present invention also relates to a method of making a detectable cable tie that includes: combining a plastic material, metal particles in a plastic carrier material and barium sulfate to form a mixture. The plastic material has a first melting point and the plastic carrier material has a second melting point. The first melting point is lower than or equal to the second melting point, preferably lower than the second melting point. The mixture is then heated to a temperature greater than the first melting point and lower than or equal to the second melting point to form a composition. A portion of the heated composition is then formed into a cable tie using a molding or an extrusion process and then cooled. The cable tie can be detected by X-ray and metal detection devices.

The plastic material of the cable tie can be a polypropylene, a polyethylene or a polyamide and the metal particles can include a ferrous material. In preferred embodiments, the composition can also include barium sulfate. The metal particles comprise at least 0.3% by weight of the composition and the barium sulfate comprises at least 0.5% by weight of the composition. Preferably, the metal particles and the barium sulfate make up from about 1 to about 5% by weight of the composition, more preferably from about 1 to about 3% by weight of the composition. In one embodiment, the plastic material is a polypropylene. In another embodiment, the metal particles are metal flakes. The metal particles and contrasting compounds make the cable ties easy to detect and remove from liquids and different process streams.

DETAILED DESCRIPTION OF THE INVENTION

The present invention relates to highly detectable cable ties and cable tie accessories with buoyant characteristics. The cable ties are constructed from plastic resins that have buoyant properties so that they float in water and most other liquids. The cable ties also include metal particles and/or contrasting compounds which facilitate the detection of the cable ties when they, or a component thereof, inadvertently falls into, or becomes a part of, a product or process stream. This detection capability (also referred to herein as "detectability") is greatly enhanced by the buoyancy of the cable ties. The combination of plastic resins, metal flakes and/or contrasting compounds, while not affecting the strength or usefulness of the cable tie, increases the various types of devices that can be employed to detect the cable ties.

As used herein, the term "cable tie" is intended to include cable ties as well as cable tie accessories, such as mounting bases, identification tags, markers, and other clamps, clips and retainers normally associated with cables or cable ties. Such cable ties and cable tie accessories are sold by Thomas & Betts Corporation under its TY-RAP® brand name. Moreover, the term "cable tie" as used herein is not limited to ties that are used with bundled wires and cables, but also refers to any type of plastic tie which includes a strap and a locking head on opposing ends or which has opposing ends that can be attached together to form a closed loop. Examples of such ties are found in U.S. Pat. No. 3,186,047 to Schwester et al.; U.S. Pat. Nos. 5,621,949 and 5,630,252 to Wells; U.S. Pat. Nos. 6,076,235; 6,128,809; and 6,185,791 to Khokhar; U.S. Pat. No. 7,017,237 to Magno, Jr. et al.; and U.S. Des. 205,940 to Miller; all of which are incorporated herein in their entirety. However, the examples in these patents are not intended to limit the construction of the term "cable tie" as used herein in any way.

Detection of failed cable ties or their severed components is an important issue in various industries and the present invention addresses this issue by providing a cable tie made from compositions with density and X-ray identifiable characteristics that make it easier to detect the cable tie. These characteristic are present in the cable tie materials and do not come from a device attached to the cable tie. This reduces the manufacturing costs and assembly time to a minimum. This also allows portions of a cable tie to be detected since all of the material in the cable tie is made from the detectable composition. Thus, even relatively small portions of the cable tie can be detected in a product stream.

The plastic typically used in manufacturing cable ties is a polyamide resin, but other materials, such as polypropylene and polycarbonate, can be used as well. Such cable ties are generally identified in the industry as a nylon or plastic cable tie. There are different types of nylon, such as nylon 6/12 and nylon 6,6, which are used to make cable ties, and they all have a density greater than 1.0 g/cm³. For example, nylon 6,12 has a density of from about 1.06 to about 1.08 g/cm³ and nylon 6,6 has a density of from about 1.13 to about 1.15 g/cm³. In general, such nylon cable ties do not float because of their high specific gravity, i.e. their density relative to water. When metal particles are added to these cable ties, the specific gravity/density increases.

The cable ties of the present invention float in liquids because their specific gravity (or density relative to water) is low enough so that they are buoyant. Buoyancy is an upward force that occurs when an object is immersed in a fluid (i.e., a liquid or a gas). The law of buoyancy was discovered by a Greek mathematician, Archimedes of Syracuse, and is sometimes called Archimedes's Principle. The law states that a body immersed or floating in a fluid is pushed up with a force equal to the weight of the fluid displaced. The weight of the displaced fluid is directly proportional to the volume of the displaced fluid (specifically, if the surrounding fluid is of uniform density), which explains why some objects float while others sink. For example, an immersed object weighs less in water than in air by an amount equal to the weight of the water displaced by the object. If the displaced water weighs as much as the object, the object floats. If the displaced water weighs less than the object, the object sinks, even though it weighs less than it did in air. Thus, when two objects have equal masses, the object with greater volume has greater buoyancy.

The plastic resins that can be used in the compositions of the present invention are polypropylenes, polyethylenes, and low density polyamides, preferably nylon and most preferably nylon 11, nylon 12 or nylon 6,12. Polypropylenes are preferred because they can be easily mixed with metal particles and metal compounds, while low density polyamide resins form particularly strong and durable cable ties. The most preferred plastic resins have the lowest density, e.g.

polypropylene or polypropylene copolymers which have densities from about 0.85 g/cm$^3$ (amorphous) to 0.95 g/cm$^3$ (crystalline). Lower density plastic resins allow greater amounts of metal particles and metal compounds to be added to the compositions used to form the cable ties.

The cable ties of the present invention are formed from compositions that have densities of less than 1.25 g/cm$^3$, preferably less than 1.15 g/cm$^3$ so that the cable ties, as well as any severed component parts, are buoyant. In the event that these buoyant cable ties fall into a product stream or inadvertently become part of a manufacturing process, they will rise to the surface of a fluid and can be easily detected visually, or by using metal detecting devices or X-ray detection devices. This facilitates the removal of the cable ties from the process or product, which is especially important in the manufacture of food products, medicine, or in the numerous other industries where the purity of the product or the process is critical.

In addition to the requirement that the cable tie material have a certain after-molded density, the cable tie material must also have an after-molded strength so that the cable ties will not fail under the loads normally placed upon them. Cable ties that can float or that have the desired specific gravity cannot be used if they do not have the required strength and flexibility. One resin that satisfies these requirements and which can also be easily molded into the desired cable tie shape is polypropylene. Polypropylene cable ties have been used mostly because of their chemical resistance properties. Other materials besides polypropylene, most preferably different types polyethylene, can also be used provided that these materials have the required after-molded density and strength characteristics.

Care must be taken so that the addition of metal particles or flakes to the plastic resin does not compromise the buoyancy characteristics of the finished product. The addition of metal flakes has to be carefully calculated and monitored in order for the final product to be within the desired specific gravity/density range. In addition, the ratio of plastic resin to metal flakes must be selected so that the cable ties can bend and/or flex without cracking. In a preferred embodiment, the metal particles/flakes are coated by a plastic resin to protect the metal particles/flakes and make them easier to process. It has been found that adding metal particles or flakes in an amount of about 0.3% by weight of the cable tie is sufficient for detection and that an amount of 0.5% by weight makes it easy to detect a cable tie.

The metal particles or flakes can be either ferrous (i.e., contain some amount of iron), or non-ferrous, which would include such materials as stainless steel, aluminum or copper. If magnetism is the mechanism used to detect the metal component of the cable tie, then ferrous metal flakes are preferred. A cable tie that floats and also incorporates metal flakes can be easily detected, via both visual means and metal detection means. The metal detection means include devices that measure magnetism. Devices that detect irregularities in density in the product stream, such as X-ray equipment, can also be employed since a metal-impregnated buoyant cable tie typically has a density greater than the material in the process stream.

The metal flakes are preferably provided in a plastic carrier material which has a melting point that is higher than the plastic material that is used to form the cable tie. The carrier material prevents the metal particles from sinking to the bottom during processing and protects the metal flakes from rusting or other corrosion due to the surrounding environment when the cable tie is used. There is no sense in employing a metal material (or a plastic one for that matter) that will corrode or deteriorate due to vapors, fumes or exposure to certain chemical or other conditions found at different facilities. Thus, the composition of the detectable cable ties is dictated by the specific applications to insure optimal performance.

Another embodiment of the present invention relates to buoyant cable ties that are made from compositions that include plastic resins and detectable materials. These detectable materials are metal particles and compounds that act as contrasting agents, which allow the cable ties to be easily detected using different types of detection equipment. Typically, the metal particles and the contrasting compounds are mixed with the plastic resins to provide a composition which is then formed into a cable tie using processes well known to those of ordinary skill in the art.

The metal particles and the metal compound are preferably combined with one or more plastic resins to form the composition prior to forming the cable tie. The metal flakes are distributed evenly throughout the pre-molded material so that the distribution carries over to the final molded product. Also, uniform suspension insures that the metal flakes do not congregate or collect at one region of the cable tie. Moreover, even dispersion of the metal particles insures a more uniform strength of the cable tie. Typically, the composition is heated to a temperature high enough to allow the cable ties to be formed using extrusion or molding processes. The temperature generally corresponds to the melting temperature of the plastic resin or the blend of plastic resins that make up the composition. Those of ordinary skill in the art relating to extrusion or molding processes are familiar with the required processing temperatures of different plastic materials.

The metal particles should be no more than about from about 1% to about 5% by weight of the cable tie, preferably from about 1% to about 3% by weight. This insures that the cable ties will float and will not crack when used to hold a bundle of wires in place. When lower density plastic materials are used, such as polypropylene, higher amounts of metal particles can be added to the composition. At the same time, a sufficient amount of the metal particles must be added to the plastic resin so that the cable ties can be easily detected. After the metal particles are added, the density of the composition is preferably no greater than 1.15 g/cm$^3$. It has been found that the cable ties must contain at least 0.3% by weight metal particles in order to be easily detectable. Thus, a cable tie containing metal particles dispersed in the cable tie material in a range of 0.3% to 5% by weight is contemplated by this invention, preferably in the range of 0.3% to 2% by weight and most preferably in the range of 0.5% to 1% by weight. Other ranges within these limits are also suitable.

The metal particles are preferably metal flakes and most preferably metal flakes in a plastic carrier material. The metal flakes are added to a plastic carrier material so that they can be more easily processed with the plastic material in conventional plastic processing equipment, such as extruders and molding machines. Any plastic that is compatible with the plastic material used to form the cable ties can be used as the plastic carrier material. The preferred plastic carrier materials are polyamides, polyethylenes and polypropylenes. Coated and or encapsulated metal particles are well known in the art and are disclosed in U.S. Pat. No. 5,198,137 to Rutz et al., which discloses iron-based particles having a weight average particle size of about 10-200 microns; U.S. Pat. No. 5,395,695 to Shain et al., which discloses permanent magnet particles having sizes ranging from 100 to 300 microns; U.S. Pat. Nos. 5,472,661 and 5,629,092 to Gay, which disclose different metal particles having sizes ranging between 1 and 500 microns with preferred average sizes of 20-100 microns and 95-175 microns; and U.S. Pat. No. 5,679,402 to Lee, which discloses ferromagnetic particles having an average particle size between about 5 microns and about 500 microns. All of these references with respect to their teachings of plastic coated metal particles are incorporated herein.

In the most preferred embodiments, the melting temperature (also referred to herein as the melting point, i.e., the temperature at which the plastic resins change state from solid to liquid) of the plastic carrier material is greater than the melting temperature of the plastic material. When the cable ties are formed, the composition is preferably heated to a temperature greater than the melting temperature of the plastic material, but lower than the melting temperature of the plastic carrier. For example, a polypropylene with a melting point of about 329° F. can be selected as the plastic material and a nylon with a melting point of about 400° F. can be selected as the plastic carrier material. When the cable ties are formed, the plastic material and the plastic carrier material can be heated to a temperature of about 350° F., which melts the plastic material but does not melt the plastic carrier material. This keeps the metal particles entrained in the plastic carrier material and prevents them from falling to the bottom of the composition during processing, or being exposed to the environment after the cable tie is formed.

As used herein, metal detection means include devices that measure or sense magnetism, whereas, X-ray devices include those devices that detect irregularities in density in the product stream. The purpose of the present invention is to provide a buoyant cable tie composition that includes components that can be readily detected and located by either system.

The contrasting compounds are materials which strongly absorb X-ray-radiation and, therefore, can be easily detected by X-rays. X-rays are a form of electromagnetic radiation with a wavelength in the range of 10 to 0.01 nanometers, corresponding to frequencies in the range 30 to 30,000 PHz ($10^{15}$ hertz). X-rays are primarily used for diagnostic radiography and crystallography. However, it has been found that a small amount of particular compounds added to plastic cable tie material prior to molding acts as a contrast agent for X-ray detection. This allows cable ties formed in this manner to be easily detected using X-ray detection devices. The contrasting compounds should be no more than about 10% by weight of the cable tie, preferably less than about 5% by weight and more preferably less than about 2% by weight. It has been found that cable ties with as little as about 0.5% by weight of a contrasting compound can be detected using X-ray devices. Thus, a cable tie containing contrasting compounds dispersed in the cable tie material in a range of 0.5% to 5% by weight is contemplated by this invention, preferably in the range of 1% to 5% by weight and most preferably in the range of 1% to 3% by weight. Other ranges within these limits are also suitable.

The contrasting compounds are used as a marker in the plastic cable tie material so that the ties can be easily detected and located in a product or process stream. Every metal absorbs X-rays to some extent depending on the atomic number and the thickness. The contrasting compounds are selected for their ability to be easily detected by X-ray detection devices when present in small amounts. Thus, the ability to detect cable ties containing these contrasting compounds using X-ray equipment is greatly enhanced. It has been found that only a slight amount of a contrasting compound is required to increase the detectability of the cable tie using X-ray devices. Preferred contrasting compounds include iodine and barium compounds, which are easy to detect using X-ray equipment and are widely used in the medical field. The most preferred compound is barium sulfate, which is typically provided in the form of an insoluble white powder. The more barium sulfate in a composition, the more "dense" the X-ray effect, i.e. the greater the X-ray signature.

The compound and the metal particles are combined with the plastic resin (or resins) prior to molding the cable tie to ensure even distribution of the component materials. The amount of compound and the amount of metal particles added to a plastic cable tie material can vary provided that the density of the composition is no greater then 1.25 g/cm$^3$, more preferably no greater then 1.15 g/cm$^3$, and that the strength and flexibility of the cable tie is not compromised. Accordingly, the amount of compound and the amount of metal particles added are particularly dependent upon the density as well as the properties and processing characteristics of the specific plastic resins that are used.

The preferred method for forming the cable ties of the present invention includes combining metal particles, a compound and a plastic material to form a mixture. The mixture is heated to melt the plastic material and form a composition. Because different plastic materials have different melting temperatures or melting points, the composition is heated to different temperatures depending on the plastic (or plastics) that are used. The heated composition is then formed into cable ties using any of the well known methods for forming cable ties. In preferred embodiments, the formation of the cable ties includes either extrusion or molding steps. After the cable ties are formed, they are cooled, preferably to room temperature.

While select preferred embodiments of this invention have been described, modifications may occur to those skilled in the art and, therefore, it is to be understood that these modifications are incorporated within these embodiments as fully as if they were fully described herein.

EXAMPLES

The examples set forth below serve to provide further appreciation of the invention but are not meant in any way to restrict the scope of the invention.

Example 1

For this example, a formulation was prepared that contained 98% by weight polypropylene having a density of 0.90 g/cm$^3$ and 2% by weight coated iron flakes. The iron flakes were coated with polypropylene and the coated iron flakes had a density of 3.90 g/cm$^3$. The total amount of iron flakes was about 1.7% by weight of the formulation. The components of the formulation were mixed together (so that the formulation had a density of about 0.96 g/cm$^3$) and then heated to a temperature of about 340° F. The heated mixture was molded into cable ties and cooled to room temperature. One of the ties was dropped into a bucket of water and was observed to float in the water. This confirmed that the cable ties were buoyant. The composition and the densities of the components are shown in Table 1, along with the result when the cable tie was dropped in water.

TABLE 1

| Material | Density (g/cm$^3$) | Weight % Used | Total Density (g/cm$^3$) |
| --- | --- | --- | --- |
| Polypropylene | 0.90 | 98.00 | 0.882 |
| Coated Metal Flakes | 3.90 | 2.00 | 0.078 |
| Barium Sulfate | 4.25 | 0.00 | 0.000 |
| Colorant | 0.95 | 0.00 | 0.000 |
| | | Total | 0.96 |
| Results: | Immediately floats to the surface | | |

Example 2

For this example, a formulation was prepared that contained 95% by weight polypropylene having a density of 0.90 g/cm³ and 5% by weight coated iron flakes. The iron flakes were coated with polypropylene and the coated iron flakes had a density of 3.90 g/cm³. The total amount of iron flakes was about 4.3% by weight of the formulation. The cable tie was formed as described in Example 1. The formulation had a density of 1.05 g/cm³ and the cable tie floated to the surface about 3 seconds after it was dropped into a bucket of water. The composition and the densities of the components are shown in Table 2, along with the result when the cable tie was dropped in water.

TABLE 2

| Material | Density (g/cm³) | Weight % Used | Total Density (g/cm³) |
|---|---|---|---|
| Polypropylene | 0.90 | 95.00 | 0.855 |
| Coated Metal Flakes | 3.90 | 5.00 | 0.195 |
| Barium Sulfate | 4.25 | 0.00 | 0.000 |
| Colorant | 0.95 | 0.00 | 0.000 |
|  |  | Total | 1.05 |
| Results: |  | Floats to surface within 3 sec. |  |

Example 3

For this example, a formulation was prepared that contained 88% by weight polypropylene having a density of 0.90 g/cm³ and 5% by weight coated iron flakes, 3% by weight barium suspension and 4% by weight colorant. The iron flakes were coated with polypropylene and the coated iron flakes had a density of 3.90 g/cm³. The total amount of iron flakes was about 4.3% by weight of the formulation. The barium was barium particles suspended in polypropylene and the suspension had a density of 4.25 g/cm³. The colorant was a polymer with a density of 0.95 g/cm³. A cable tie was formed as described in Example 1. The formulation had a density of 1.15 g/cm³ and the cable tie floated to the surface about 6 seconds after it was dropped into a bucket of water. The composition and the densities of the components are shown in Table 3, along with the result when the cable tie was dropped in water.

TABLE 3

| Material | Density (g/cm³) | Weight % Used | Total Density (g/cm³) |
|---|---|---|---|
| Polypropylene | 0.90 | 88.00 | 0.792 |
| Coated Metal Flakes | 3.90 | 5.00 | 0.195 |
| Barium Sulfate | 4.25 | 3.00 | 0.127 |
| Colorant | 0.95 | 4.00 | 0.038 |
|  |  | Total | 1.15 |
| Results: |  | Floats to surface within 6 sec. |  |

Example 4

For this example, a formulation was prepared that contained 74% by weight polypropylene having a density of 0.90 g/cm³ and 13% by weight coated iron flakes, 5% by weight barium suspension and 8% by weight colorant. The iron flakes were coated with polypropylene and the coated iron flakes had a density of 3.90 g/cm³. The total amount of iron flakes was about 4.3% by weight of the formulation. The barium was barium particles suspended in polypropylene and the suspension had a density of 4.25 g/cm³. The colorant was a polymer with a density of 0.95 g/cm³. The cable ties were formed as described in Example 1. The formulation had a density of 1.46 g/cm³ and the cable tie did not float to the surface after it was dropped into a bucket of water. The composition and the densities of the components are shown in Table 4, along with the result when the cable tie was dropped in water.

TABLE 4

| Material | Density (g/cm³) | Weight % Used | Total Density (g/cm³) |
|---|---|---|---|
| Polypropylene | 0.90 | 74.00% | 0.666 |
| Coated Metal Flakes | 3.90 | 13.00% | 0.507 |
| Barium Sulfate | 4.25 | 5.00% | 0.212 |
| Colorant | 0.95 | 8.00% | 0.076 |
|  |  | Total | 1.46 |
| Results: |  | Does not float to surface |  |

After the test for buoyancy was performed on the cable ties, they were placed on a table and scanned with a metal detecting device manufactured by Thermo Electron Corporation, Waltham, Mass., which was set to detect metal particles at 0.170 cm/ferrous sphere. The metal detector indicated that the cable ties contained metal. This confirmed that the cable ties could be detected using a metal detecting device. The cable ties were then X-rayed with an X-ray device manufactured by Smith-Heimann, Eagle FA detector. The X-ray showed that the cable ties provided a distinct X-ray image.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A buoyant cable tie formed from a composition comprising:
    a plastic material; and
    metal particles, wherein the metal particles comprise a ferrous material and have an average particle size of at least 20 microns;
    wherein the plastic material and the metal particles are combined to form a composition, and
    wherein the cable tie has a density equal to or less than 1.0 g/cm³, floats in water and can be detected by metal detection devices.

2. The cable tie as set forth in claim 1, wherein the plastic material is a polypropylene, a polyethylene or a polyamide.

3. The cable tie as set forth in claim 1, wherein the composition further comprises barium sulfate.

4. The cable tie as set forth in claim 3, wherein the metal particles and the barium sulfate comprise from about 1 to about 5% by weight of the composition.

5. The cable tie as set forth in claim 3, wherein the plastic material is a polypropylene.

6. The cable tie as set forth in claim 3, wherein the cable tie can be detected by X-ray, sonar, optical or visual detection devices.

7. The cable tie as set forth in claim 3, wherein the metal particles comprise at least 0.3% by weight of the composition and the barium sulfate comprises at least 0.5% by weight of the composition.

8. The cable tie as set forth in claim 1, wherein the metal particles comprise metal flakes.

9. The cable tie as set forth in claim 1, wherein metal particles have an average particle size of between about 20 microns and about 500 microns.

10. A buoyant cable tie formed from a composition comprising:
- a plastic material having a first melting point; and
- metal particles entrained in a plastic carrier material, wherein the metal particles comprise a ferrous material, and wherein the plastic carrier material has a second melting point and wherein the first melting point is lower than or equal to the second melting point;
- wherein the average density of the composition is less than 1.0 g/cm$^3$ and wherein the cable tie floats and can be detected by metal detection devices.

11. The cable tie as set forth in claim 10, wherein the metal particles comprise at least 0.3% by weight of the composition.

12. The cable tie as set forth in claim 10, wherein the metal particles comprise metal flakes.

13. The cable tie as set forth in claim 10, wherein the plastic material is a polypropylene, a polyethylene or a polyamide.

14. The cable tie as set forth in claim 10, wherein the composition further comprises barium sulfate.

15. The cable tie as set forth in claim 14, wherein the metal particles and the barium sulfate comprise from about 1 to about 3% by weight of the composition.

16. The cable tie as set forth in claim 14, wherein the metal particles comprise at least 0.3% by weight of the composition and the barium sulfate comprises at least 0.5% by weight of the composition.

17. The cable tie as set forth in claim 14, wherein the plastic material is a polypropylene.

18. The cable tie as set forth in claim 10, wherein the cable tie can be detected by X-ray, sonar, optical or visual detection devices.

19. The cable tie as set forth in claim 10, wherein metal particles have an average particle size of between about 20 microns and about 500 microns.

20. The cable tie as set forth in claim 10, wherein metal particles have an average particle size of at least 20 microns.

21. A buoyant cable tie formed from a composition comprising:
- a plastic material having a first melting point;
- metal particles entrained in a plastic carrier material, wherein the metal particles comprise a ferrous material, and wherein the plastic carrier material has a second melting point and wherein the first melting point is lower than or equal to the second melting point; and
- barium sulfate,
- wherein the average density of the composition is less than 1.0 g/cm$^3$ and wherein the cable tie floats and can be detected by X-ray and metal detection devices.

22. The cable tie as set forth in claim 21 wherein the metal particles comprise at least 0.3% by weight of the composition and the barium comprises at least 0.5% by weight of the composition.

23. The cable tie as set forth in claim 21, wherein the metal particles comprise metal flakes.

24. The cable tie as set forth in claim 21, wherein the plastic material comprises a polypropylene, a polyethylene or a polyamide.

25. The cable tie as set forth in claim 21, wherein the metal particles and the barium sulfate comprise from about 1 to about 3% by weight of the composition.

26. The cable tie as set forth in claim 21, wherein the plastic material is a polypropylene.

27. The cable tie as set forth in claim 21, wherein metal particles have an average particle size of between about 20 microns and about 500 microns.

28. The cable tie as set forth in claim 21, wherein metal particles have an average particle size of at least 20 microns.

* * * * *